Figure 1:
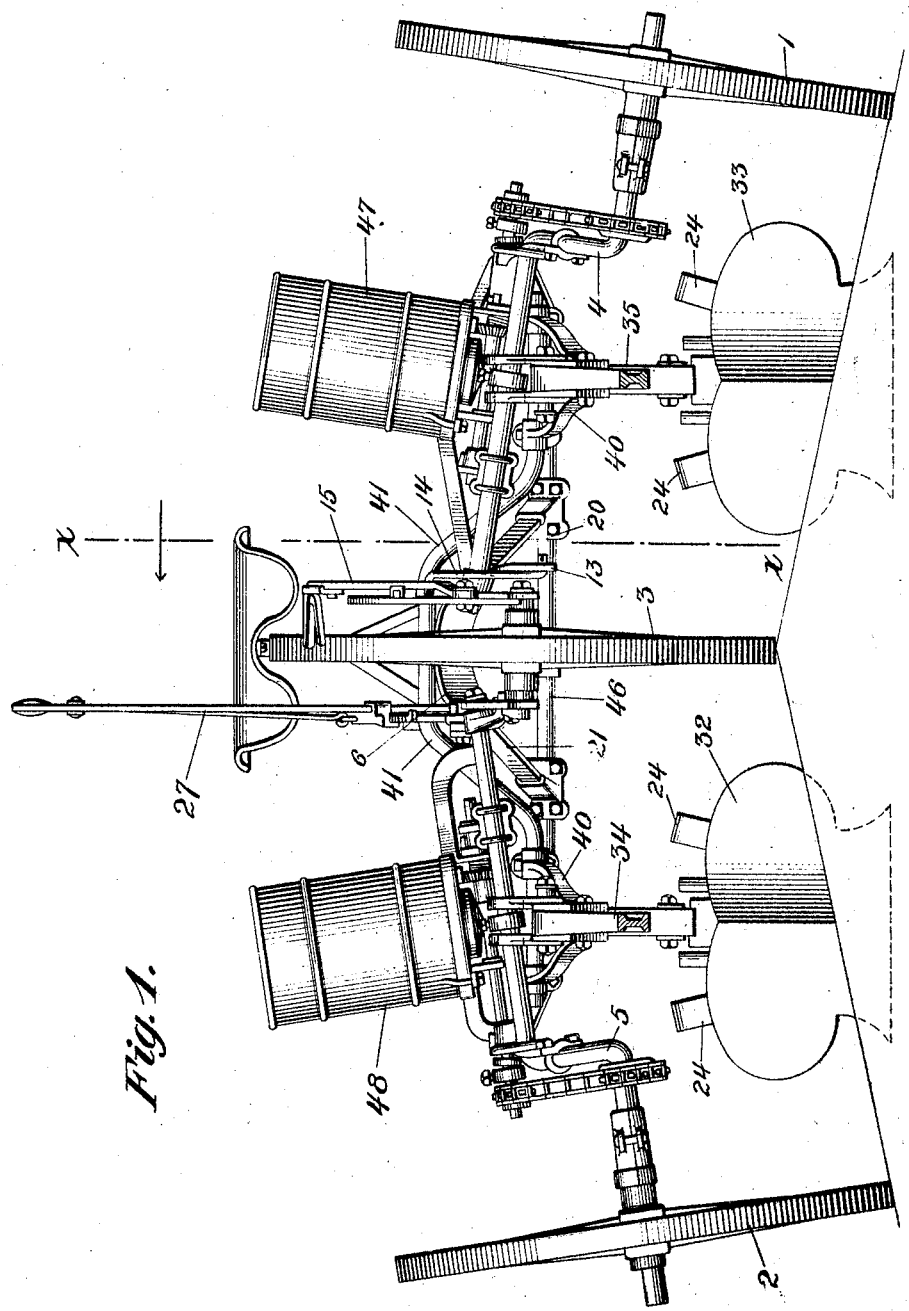

A. C. LINDGREN.
AGRICULTURAL IMPLEMENT.
APPLICATION FILED NOV. 11, 1908.

966,568.

Patented Aug. 9, 1910.

6 SHEETS—SHEET 1.

Witnesses:

Inventor
A. C. Lindgren
By his Attorney
P. T. Dodge

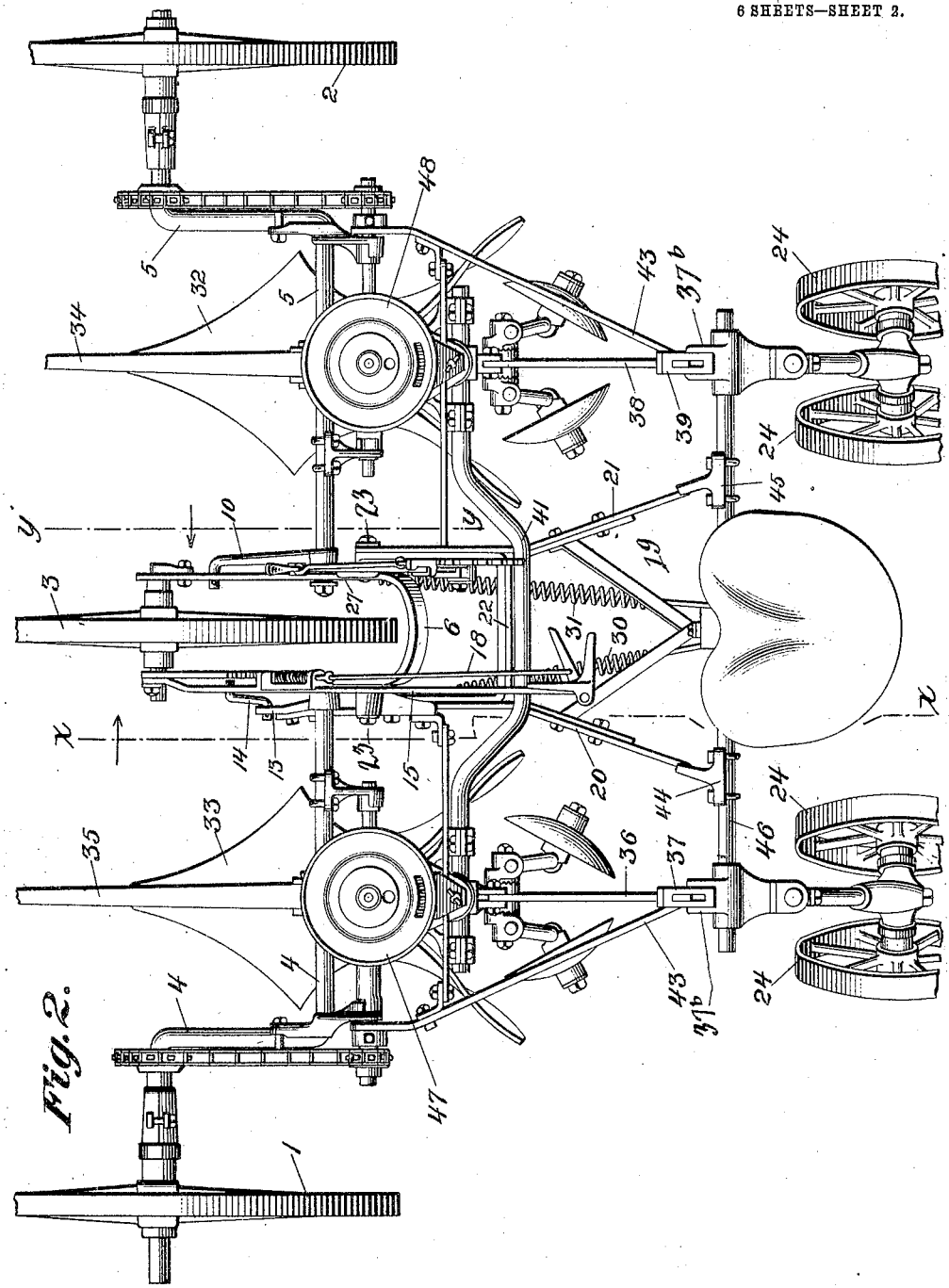

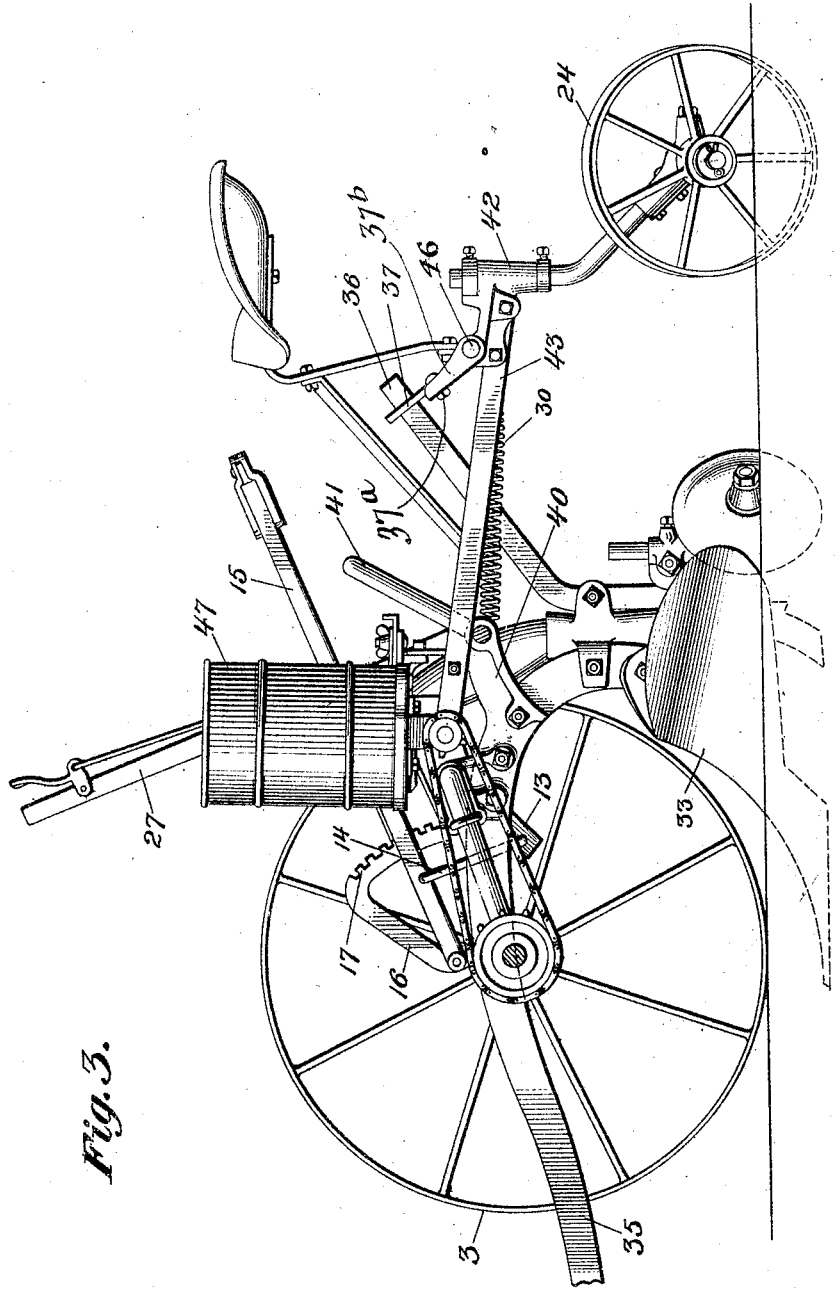

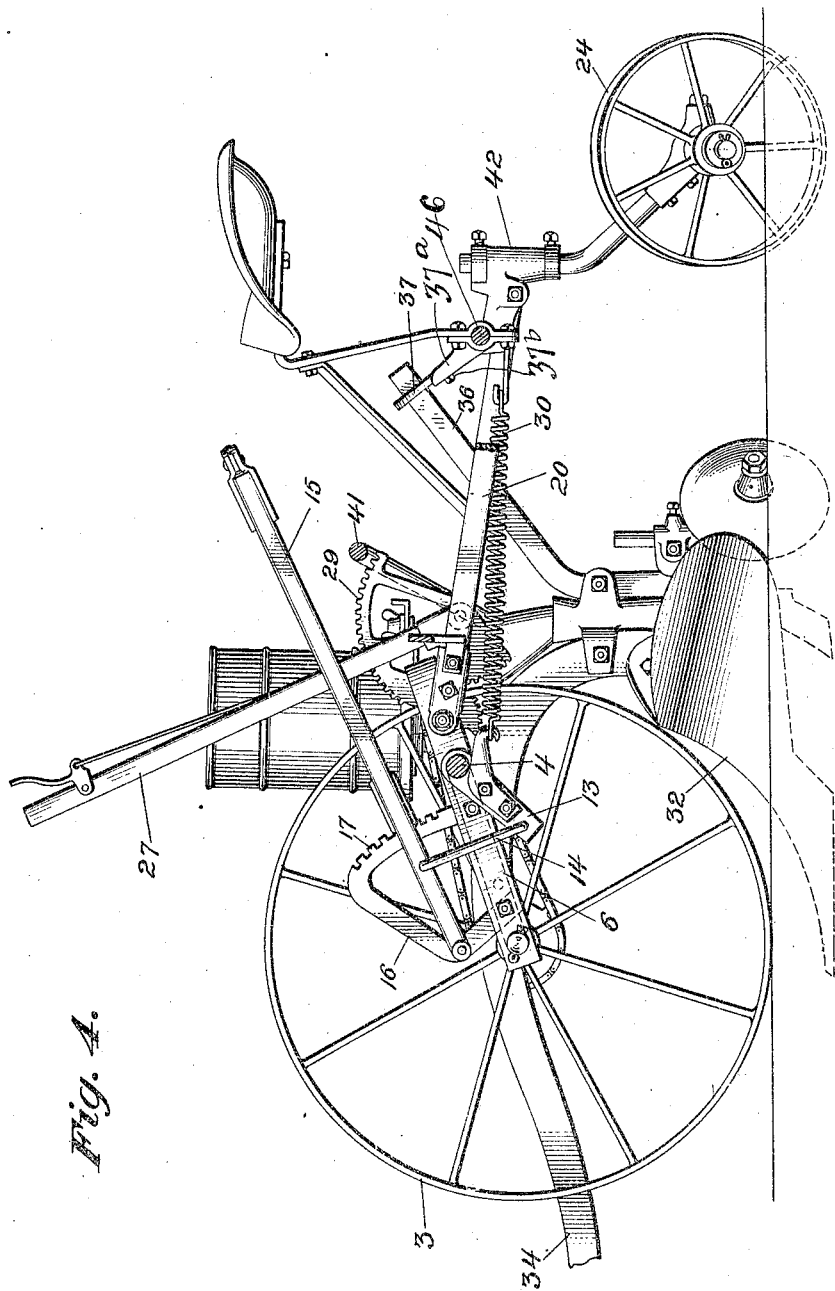

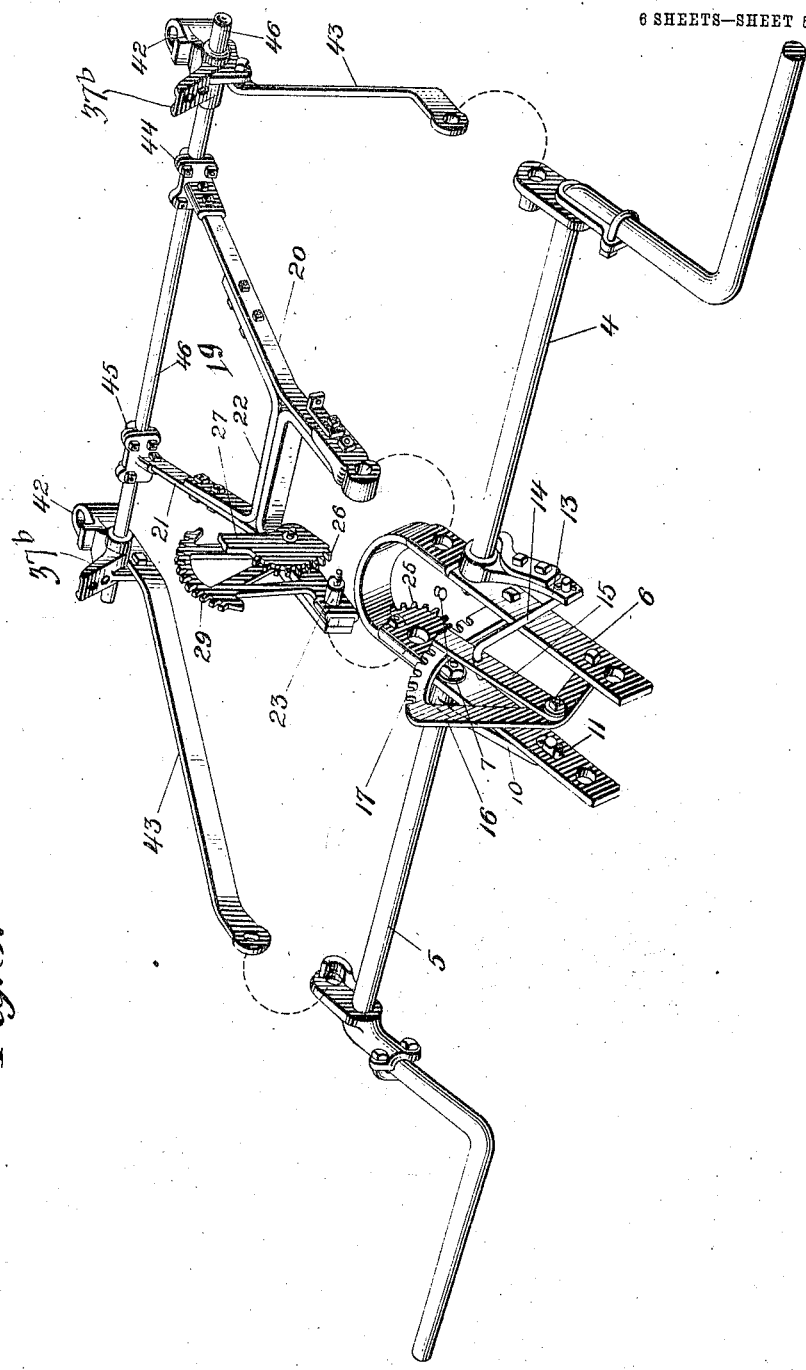

A. C. LINDGREN.
AGRICULTURAL IMPLEMENT.
APPLICATION FILED NOV. 11, 1908.
966,568.
Patented Aug. 9, 1910.
6 SHEETS—SHEET 6.
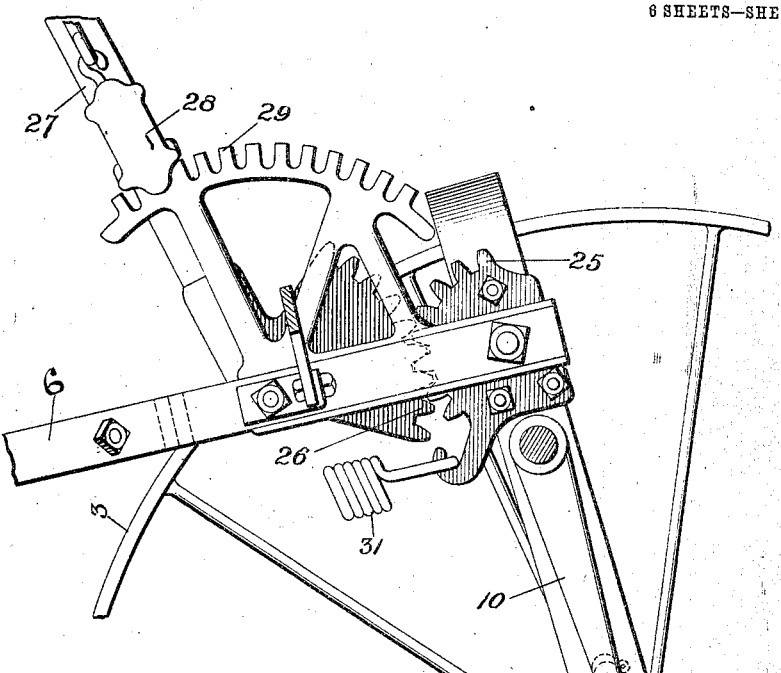
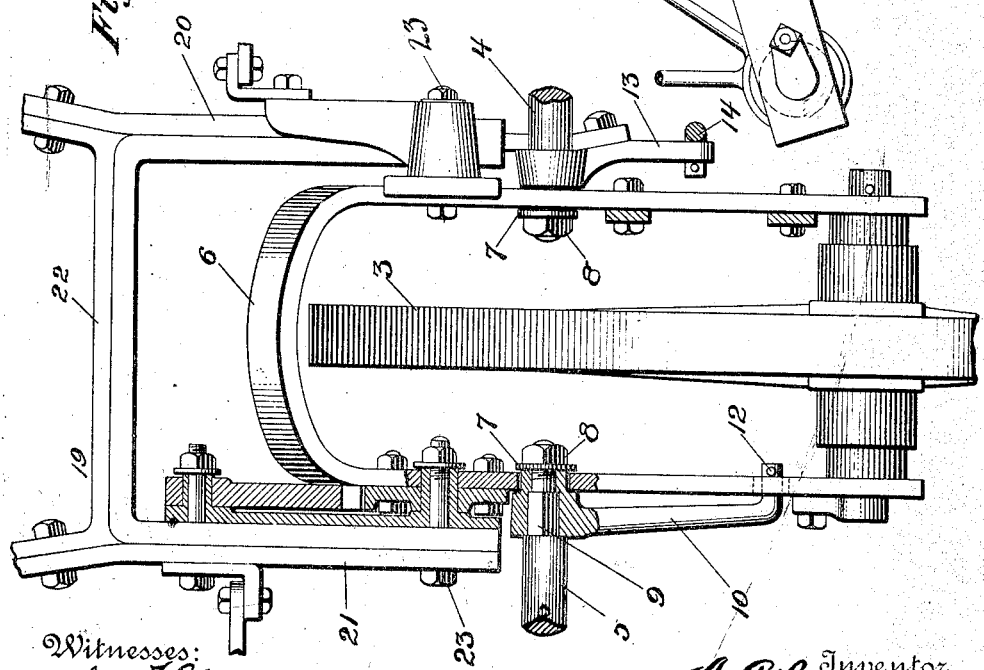

ALEXUS C. LINDGREN, OF MOLINE, ILLINOIS, ASSIGNOR TO MOLINE PLOW COMPANY, A CORPORATION OF ILLINOIS.

AGRICULTURAL IMPLEMENT.

966,568.

Specification of Letters Patent. Patented Aug. 9, 1910.

Application filed November 11, 1908. Serial No. 462,064.

*To all whom it may concern:*

Be it known that I, ALEXUS C. LINDGREN, of Moline, county of Rock Island, and State of Illinois, have invented a new and useful Improvement in Agricultural Implements, of which the following is a specification.

The invention relates to plows, planters, cultivators, and the like, and more especially to machines for plowing or planting a plurality of furrows or rows at one time.

The invention is shown and described herein as applied to a double-row lister plow.

The objects of the invention are to provide a machine which will plow or plant simultaneously a plurality of rows at a desired depth while operating on even or uneven ground; to provide at the same time for operating the various plowing or other corresponding devices at different depths when desired, and also for maintaining them substantially in their relative positions when passing over uneven ground; to provide a machine which is sufficiently strong to meet the duties placed upon it while being at the same time of light weight and therefore of easy draft. These and other objects of invention are in part more fully set forth herein and will be in part obvious to those skilled in the art.

The invention consists in the novel parts, constructions, arrangements, improvements and combinations herein shown and described.

The accompanying drawings, referred to herein and forming a part hereof, illustrate one embodiment of the invention, the same serving in connection with the description herein to explain the principles of the invention.

Of the drawings: Figure 1 is a front elevation of a machine constructed in accordance with the principles of the invention; Fig. 2 is a plan view corresponding generally to Fig. 1; Fig. 3 is a side elevation with outer ground wheel removed; Fig. 4 is a vertical longitudinal section on the line *x—x* of Fig. 1, and Fig. 2; Fig. 5 is a perspective view of the frame, axles and certain coöperating parts; Fig. 6 is an enlarged detail view on the line *y—y* of Fig. 2; and Fig. 7 is a fragmentary plan view corresponding to Fig. 6 with certain parts shown in section.

Referring to the accompanying drawings, which illustrate by way of example an embodiment of the invention; three supporting and progressing members are shown, one of said members being centrally located with respect to the other two. Said members are shown as ground wheels 1 and 2, with the wheel 3 located centrally thereof, and they are further shown substantially in alinement transversely of the machine.

Flexible connections are provided between the ground wheels 1, 2 and 3 for the purpose of permitting relative vertical movement between them as they progress over the surface of the ground. The wheels 1 and 2 are mounted on the stub ends of the offset axles 4 and 5, respectively. The central ground wheel 3 is mounted or carried in the member 6 of a frame extending longitudinally of the machine. This frame member is shown yoked about the axle of the wheel (see especially Figs. 2 and 7). The inward ends of the axles 4 and 5 take into the frame member 6, as shown at 7, and are secured in any suitable manner, as by a bolt and nut 8. The apertures in the frame member 6 are larger than the axle, thus affording play of the parts to permit the relative vertical movement between the wheels.

According to one feature of the invention the frame member 6 has an angular movement in a substantially vertical direction. In the present embodiment it is pivotally connected to frame member 19 as will be more fully set forth hereinafter. The axles 4 and 5 have a corresponding movement. Means for securing said movement of the axles with the frame are provided, and in the illustrated form thereof, there is shown carried upon the squared part 9 of the axle 5 an arm 10, the end thereof being bent and passing through an aperture 11 in the frame member 6. The aperture 11 is proportioned and shaped so as to permit the desired relative movement of the wheels as they pass over the ground, while causing the axle to move with the yoke in its angular adjustment. A suitable fastening device may be used to prevent accidental withdrawal of the arm 10 from the aperture 11, and a linch pin 12 is shown for this purpose. In the drawings also the end of the axle 5 is shown conveniently bushed in the hub of the arm 10 which is shown passing through the aperture 7. In Fig. 5 said parts are shown slightly separated in order to more clearly show the construction.

According to one feature of the invention, means are provided for changing the angular relation of the vertically adjustable frame member and an offset axle, and a form of such means is shown in the drawings applied to the axle 4. Fixed to said axle is shown an arm 13 connected by a link 14 to the lever 15, pivoted on the bracket 16 carried by the frame member 6. The lever 15 is provided with a spring latch mechanism 18 which coöperates with the rack 17 to hold the lever in position.

A frame member 19 is jointed to the frame member 6 so as to permit adjustment to different relative angles. In the drawings herewith the frame member 19 is shown as comprising longitudinally extending members 20 and 21 connected by a cross brace 22. The frame member 19 is further shown connected to the member 6 by transverse, horizontal pivot bearings, and for this purpose the forward ends of the members 20 and 21 are shown pivotally connected at either side of the yoke 6 and secured by suitable bolts 23. The other end of the frame member 19 is supported upon suitable devices, shown herein as caster wheels 24.

Suitable means for effecting the angular adjustment of the two parts of the frame and for maintaining them in adjusted position are provided. A toothed sector 25 is shown fixed to the yoke 6 and meshing therewith a toothed sector 26 fixed to the lever 27, which is pivoted to the frame member 21. The lever 27 engages by a suitable spring latch 28 with the rack 29 fixed to said member 21. Suitable lifting springs 30 and 31 are provided to assist the operator in adjusting the machine. They are connected to said frame member 6 and also to the rear of the frame, and tend to draw the frame members together about their pivot, thus assisting in the raising and acting to yieldingly resist the lowering movement. The spring 30 is further shown connected to the arm 13. It thereby acts to assist also in the operation of the lever 15 in changing the angular relation of the axle 4 and frame member 6.

The plows are supported so as to be raised or lowered as the operator causes the jointed frame members to open out from, or to close in toward, each other. In the drawings plows 32 and 33 are shown at either side of the center of the machine and their beams 34 and 35 are shown loosely suspended from the offset parts of the axles 5 and 6, respectively, so as to have movement relative thereto both longitudinally and transversely of the machine. By such mounting the plows may be kept in a horizontal position both longitudinally and transversely of the machine.

To control the movements of the beam to preserve the level of the plow longitudinally of the machine, an arm 36 fixed with reference to the plow beam is shown extending obliquely upward through a slot in the standard 37 fixed on the rear part of the machine. The piece 37 may be adjusted by means of an adjusting bolt $37^a$ extending through an arm $37^b$ on the frame and into the piece 37 to vary the pitch or inclination of the plow when desired. Corresponding parts 38 and 39 are shown for the other plow beam. Fixed with respect to the plow beams are shown brackets 40 attached rigidly to a cross rod 41, which serves to hold the plows in proper relation with one another. By means of this rod and the mounting of the plow beams upon the axles so as to permit of movement transversely of the machine, the plow bottoms may be maintained parallel.

A construction is provided whereby a suitable part of the weight carried by the frame is thrown upon the outer ground wheels while at the same time permitting the relative vertical movement therebetween due to inequalities in the ground. This serves to distribute the strains to which the machine is subjected, and also makes the outside wheels available for driving the seeding mechanism or other parts. In the form of such construction shown herein the caster wheels 24 are vertically swiveled in blocks 42 to which are fixed bars 43, said bars being also movably connected to the axles 4 and 5. The rear end of the frame 19 is shown pivotally connected to the blocks 42. In the illustrated form of such pivot connection, member 19 is shown fixed at 44 and 45 to the rod 46 which bears pivotally in the blocks 42. It will thus be seen that free movement of the frame parts is permitted but at the same time a proper proportion of the weight of the machine parts and of the operator is transmitted to the outer ground wheels while permitting freedom of movement at the flexible connections between the axles and the frame member 6.

The mechanism hereinbefore described is shown as giving support to seed hoppers 47 and 48, containing seed distributing mechanism not shown, and adapted to be operated from the ground wheels. Such seeding mechanism per se forms no part of the present invention.

It will be understood that when the operator moves the lever 27 forwardly, the sectors 26 and 25 will operate to increase the angle between the parts 6 and 19 of the frame, thus causing a lowering of the frame and connected parts. The supporting rod 46 will turn in its bearings in the block 42, as the frame member 19 swings, thus permitting free movement of the frame while serving to carry and distribute the weight in the manner heretofore described. The offset part of the axles 4 and 5, by reason of their connections to the yoke 6 will also have a swinging or angular movement therewith, and will likewise be lowered. When the lever 27 is moved in the opposite direction, the reverse movement of the parts takes place, as will be clearly understood. The plows being supported from the offset parts of the axles, they will be raised or lowered with the corresponding movement of the mechanism just described. The plows will be maintained in their longitudinal positions by the mechanisms described. When it is desired to change the relative depth between the two plows, this may be effected by movement of the lever 15 and the coöperating mechanisms hereinbefore described. As hereinbefore stated, the litfing spring 30 is connected so as to assist in the operation of both levers. It will be seen further that the operation of these parts does not interfere with the action of the flexible connections between the ground wheels.

The use of the third wheel, that is the central ground wheel, gives a double row machine without the expense and weight of a single frame between two outer wheels which would be strong enough to support two listers. The flexible frame, furthermore, keeps each plow at the proper depth, as it accommodates itself to irregularities in the surface of the ground, as each of the three ground wheels may run high or low with respect to the other two, dependent upon the variations of the surface. In Fig. 1 the central ground wheel is shown running on relatively high ground, but it will be understood that each ground wheel possesses capability of following the surface whether the level be above or below with respect to either of the other ground wheels or both of them. The construction of frame hereinbefore described whereby an approximately proportionate part of the weight is transmitted through the frame members 43, throws about the same load on each of the front wheels, thus facilitating said flexible action, distributing the strains falling upon the machine frame, and bestowing other advantages.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:

1. In combination with three supporting members, one of said members being centrally located with respect to the other two, flexible connections between said three members to permit relative vertical movement of one of said members with respect to the others, and a plow supported between each of the side members and the central member.

2. In combination with three ground wheels, one located centrally of the others, flexible connections between said wheels to permit vertical movement of one of the wheels with respect to another, and a plow carried on either side of the central wheel and between it and the corresponding outer wheel.

3. In combination with three ground wheels, substantially in alinement transversely of the machine, one located centrally of the others, flexible connections between said wheels to permit vertical movement of one of the wheels with respect to another, and a plow carried on either side of the central wheel and between it and the corresponding outer wheel.

4. In combination with three supporting members, one of said members being centrally located with respect to the other two, flexible connections between said three members to permit of vertical movement of one of said members with respect to the other, a plow supported between each of the side members and the central member, and means for raising and lowering the plow with respect to the supporting and progressing members.

5. In combination with three ground wheels substantially in alinement transversely of the machine, axles for the wheels having offset parts, plows supported at either side of the central wheel on said offset parts of the axles, supporting and progressing means located out of alinement with said wheels, and means for rotating said offset portions vertically to raise and lower the plows.

6. In combination with three ground wheels substantially in alinement transversely of the machine, axles for the wheels having offset parts, plows supported at either side of the central wheel on said offset parts of the axles, supporting and progressing means located out of alinement with said wheels, means for rotating said offset portions vertically to raise and lower the plows, and a plow suspended from the offset part of the axle.

7. In combination with a central ground wheel, a frame member in which said wheel is mounted, a rear frame member jointed thereto, a caster wheel supporting the rear frame member, means for adjusting said frame members to different relative angles, a ground wheel at either side of said central ground wheel, and connections between the three ground wheels.

8. In combination with a central ground wheel, a frame member in which said wheel is mounted, a rear frame member jointed thereto, a caster wheel supporting the rear frame member, means for adjusting said frame members to different relative angles, a ground wheel at either side of said central ground wheel, flexible connections between the three ground wheels so as to permit relative vertical movement thereof, and a plow supported at either side of the central ground wheel and between it and the outside ground wheels.

9. In combination with a central ground wheel, a frame member in which said wheel is mounted, a rear frame member jointed thereto, a caster wheel supporting the rear frame member, means for adjusting said frame members to different relative angles, a ground wheel at either side of said central ground wheel, and an offset axle for each of the outer ground wheels connected to said front frame member away from the axle of the central ground wheel.

10. In combination with a central ground wheel, a frame member in which said wheel is mounted, a rear frame member jointed thereto, a caster wheel supporting the rear frame member, means for adjusting said frame members to different relative angles, a ground wheel at either side of said central ground wheel, and an offset axle for each of the outer ground wheels flexibly connected to said front frame member away from the axle of the central ground wheel.

11. In combination with a central ground wheel, a frame member in which said ground wheel is mounted, said frame member being free to swing vertically, a ground wheel at either side of said central wheel and in substantial alinement therewith, an axle for each of said side ground wheels, a part of said axle being offset and connected to said frame member by a flexible connection to permit vertical movement of one wheel with respect to another, and a connection between said axle and said frame so that the axle may swing to and fro vertically with the frame.

12. In combination with a central ground wheel, a frame member in which said ground wheel is mounted, said frame member being free to swing vertically, a rear frame member jointed to said frame member, means for adjusting said frame members to different relative angles, a supporting and progressing device attached to the rear frame member, and a plow at each side of the central wheel supported to be raised or lowered as the relative angle between the parts of the frame is changed.

13. In combination with a central ground wheel, a frame member in which said ground wheel is mounted, said frame member being free to swing vertically, a rear frame member jointed to said frame member, means for adjusting said frame members to different relative angles, a supporting device attached to the rear frame member, a ground wheel at either side of said central wheel and in substantial alinement therewith, an axle for each of said side ground wheels, a part of said axle being offset and connected to said frame member by a flexible connection to permit vertical movement of one wheel with respect to another, a connection between said axle and said frame so that the axle may swing to and fro vertically with the frame, and a plow supported on each of said offset parts of the axle.

14. In combination with two supporting ground wheels, an offset axle between said wheels, two plow beams supported from the offset portions of the axles so as to swing longitudinally beneath same, and a rigid connection between the two plow beams.

15. In combination with two supporting ground wheels, an offset axle between said wheels, two plow beams supported from the offset portions of the axles so as to swing transversely beneath same, and a rigid connection between the two plow beams.

16. In combination with three ground wheels substantially in alinement, a frame flexibly connecting each of the outer wheels and the central wheel to permit vertical movement of one wheel relatively to the other, a plow beam suspended from the axle between the central ground wheel and each of the outer ground wheels so as to swing relatively to the axle, and a rigid connection between the plow beams.

17. In combination with a central supporting member, a supporting member located rearwardly thereof, a frame connecting said members, a supporting member arranged at either side of said central member, means flexibly connecting each of said side supporting members to said central supporting member to permit relative vertical movement of said members, and connections between said frame and said side supporting members for causing them to carry part of the weight while permitting said vertical movement.

18. In combination with a central ground wheel, rear caster wheels, a frame connecting said ground wheel and rear caster wheels, two outside ground wheels, flexible connections between said three ground wheels for permitting relative vertical movement thereof, and connections between the frame and the outer ground wheels for placing a part of the weight upon them while permitting said relative vertical movement.

19. In combination with a central ground wheel, rear caster wheels, a frame connecting said ground wheel and rear caster wheels, two outside ground wheels, flexible connections between said three ground wheels for permitting relative vertical movement thereof, and connections between the frame and the outer ground wheels for placing a part of the weight upon them while permitting said relative vertical movement.

20. In combination with a central ground wheel, rear caster wheels, a frame connecting said ground wheel and rear caster wheels comprising two members connected so as to be adjusted at various vertical angles with respect to each other, pivotal connections between the rear of the frame and said rear caster wheels, two outside ground wheels, flexible connections between said three ground wheels for permitting relative vertical movement thereof, and connections between the frame and the outer ground wheels for placing a part of the weight upon them while permitting said relative vertical movement.

21. In combination with a central ground wheel, rear caster wheels, a yoke frame member extending rearwardly in which the central ground wheel is carried, two outside ground wheels, an offset axle flexibly connecting each of said ground wheels to the yoke frame member, weight carrying members connecting the caster wheels to the axles, and a rear frame member pivotally connected to the said yoke frame member and to the said weight carrying members.

22. In combination with three ground wheels substantially in alinement, front and rear frame members jointed together on a horizontal transverse axis, offset axle members flexibly connecting the outer ground wheels to the jointed frame, rear caster wheels, weight carrying members connecting the caster wheels to said axles, and a pivotal connection between said weight carrying members and the rear end of the rear frame member.

23. In combination with three ground wheels substantially in alinement, front and rear frame members jointed together on a horizontal transverse axis, means for adjusting said members to different relative angles to raise and lower the plow, a plow suspended at each side of the central ground wheel, offset axle members flexibly connecting the outer ground wheels to the jointed frame, rear caster wheels, weight carrying members connecting the caster wheels to said axles, and a pivotal connection between said weight carrying members and the rear end of the rear frame member.

24. In combination with three ground wheels substantially in alinement, front and rear frame members jointed together on a horizontal transverse axis, means for adjusting said members to different relative angles to raise and lower the plow, a plow suspended at each side of the central ground wheel, offset axle members flexibly connecting the outer ground wheels to the jointed frame, rear caster wheels, weight carrying members connecting the caster wheels to the offset portion of said axles, and a pivotal connection between said weight carrying members and the rear end of the rear frame member.

25. In combination with a central and two side ground wheels, a wheel frame comprising front and rear members jointed together on a horizontal transverse axis, the forward member being supported by the axle of the central ground wheel, an offset axle connecting an outer ground wheel and the said frame member at a point away from the axis of the central ground wheel, and means for changing the relative position of said forward frame member and the offset portion of the axle.

26. In combination with a central and two side ground wheels, a wheel frame comprising front and rear members jointed together on a horizontal transverse axis, means for changing the angular position of the front and rear frame members, the forward member being supported by the axle of the central ground wheel, an offset axle connecting an outer ground wheel and said frame member at a point away from the axis of the central ground wheel, and means for changing the relative angular position of said forward frame member and the offset portion of the axle.

In testimony whereof I hereunto set my hand this fourth day of November, 1908, in the presence of two attesting witnesses.

ALEXUS C. LINDGREN.

Witnesses:
J. L. IRVING,
L. C. BLANDING.